United States Patent Office 2,771,658
Patented Nov. 27, 1956

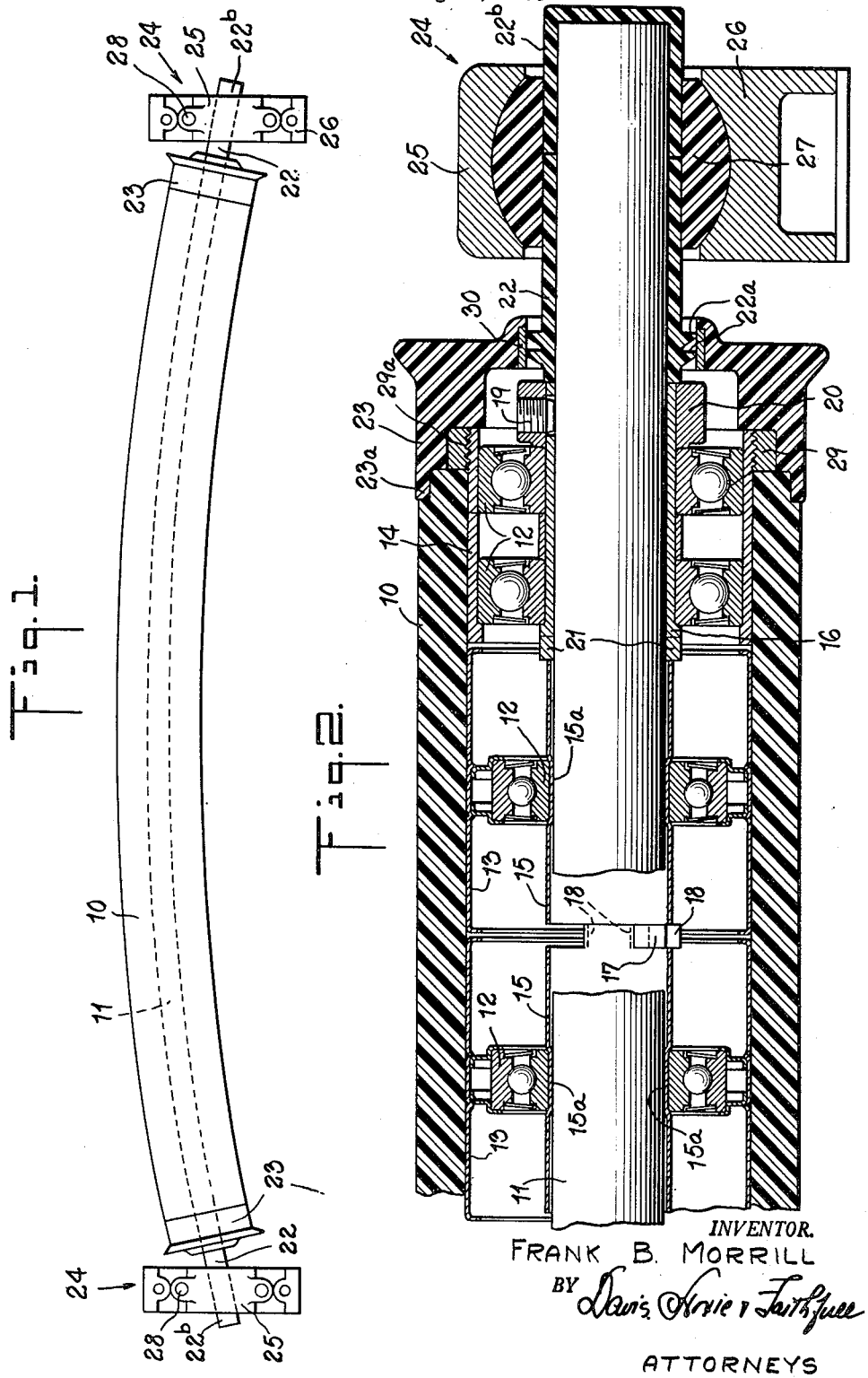

2,771,658
ROLL FOR EXPANDING AND CONTRACTING TEXTILES

Frank B. Morrill, North Adams, Mass., assignor to James Hunter Machine Company, North Adams, Mass., a corporation of Massachusetts Application August 3, 1953, Serial No. 371,949

5 Claims. (Cl. 26—63)

This invention relates to expander and contractor rolls for use in changing the width of a flexible sheet material by drawing the material partly around the roll.

In rolls of this type as commonly made, a flexible rubber-like sheath is supported on and closely surrounds metal roll sections rotatably mounted on a stationary bowed shaft by means of bearings. This flexible sheath forms the working surface of the roll, the sheet material being drawn partly around it so as to rotate the sheath and the roll sections on their bearings about the bowed shaft as a stationary axis. During this rotation, one part of the flexible sheathing is expanding lengthwise of the shaft while a diametrically opposed part is contracting lengthwise. Thus, if the fabric or other flexible sheet material is fed to the roll at its concave side and leaves the roll at its convex side, it will be spread widthwise; and it will tend to contract widthwise if these feeding and leaving points are reversed.

It is highly desirable to seal the ends of the rubber-like sheath around the shaft, not only to protect the bearings from dust, dirt and moisture but also to prevent escape of the lubricant for the bearings. If oil or grease from the bearings should pass outward through either end of the sheath, there is danger that it will become deposited on the working surface of the roll or in some other way reach the sheet material being treated. The problem of sealing the roll ends to prevent this is complicated by the fact that the rubber-like sheath is undergoing distortions as it rotates on the surved shaft; and prior attempts and proposals to solve the problem have not met with success.

The present invention has for its principal object the provision of an improved expander and contractor roll in which the bearings on the curved shaft are effectively sealed at the ends of the rubber-like surface or sheath of the roll, and which is of relatively simple construction.

According to the invention, I provide at each end portion of the curved shaft a stationary sleeve fitted closely around the shaft, and a cap surrounding the sleeve and tightly engaging the flexible sheath around the end thereof, so that the cap rotates with this cylindrical sheath. The cap and sleeve have interengaging annular members forming a seal around the shaft; and one of these members, or the cap or sleeve itself, is made of elastic material to accommodate the distortions of the cylindrical sheath as it rotates on the curved shaft. Preferably, both the sleeve and the cap are made of elastic material and one of them carries a substantially rigid ring forming one of the annular sealing members, while the other carries an elastic rib engaging the ring and forming the other annular member. The cap is releasably secured to the sheath so that it can be removed therefrom to obtain access to the interior of the roll.

With this construction, the close fit of the stationary sleeve on the shaft and the close fit of the rotating cap on the sheath effectively seal the end of the roll around the shaft except for the annular space between the cap and sleeve; and there the annular sealing members can perform their sealing function efficiently because of the elasticity of the parts permitting a flexing movement with the distortions of the sheath, thereby maintaining a good contact between the annular sealing members as one rotates relative to the other. In the preferred construction, the sleeve on the shaft end is clamped around the shaft by the bracket which supports the shaft end, so that the bracket holds both the sleeve and the shaft stationary.

For a better understanding of the invention, reference may be had to the accompanying drawing, in which:

Fig. 1 is a front elevational view of a preferred form of the new roll, and

Fig. 2 is an enlarged horizontal sectional view along part of the curved shaft axis in Fig. 1.

Referring to the drawing, the roll comprises a rubber-like sheath 10 of cylindrical form constituting the working surface of the roll. The sheath 10 is rotatably mounted on a stationary curved shaft 11 by bearing units 12 secured within rigid roll sections 13 and 14 directly supporting the surrounding sheath. The inner races of the bearing units 12 are held against rotation on the shaft 11 in any suitable manner, and for this purpose I prefer to use the arrangement disclosed and claimed in a co-pending application of Louis M. Gageant, Serial No. 371,887, filed August 3, 1953.

As here shown, this arrangement includes a series of cylindrical spacers 15 and 16 located within the roll sections 13 and 14, respectively, and closely surrounded by the inner races of the respective bearings. The spacer 16 at each end of the series is fitted closely around the shaft 10, while the intermediate spacers 15 surround the shaft rather loosely except at their central portions 15a, where they are made of smaller diameter to receive the inner races of the bearings. Each roll section 13 and the bearing 12 and spacer 15 within it are assembled as a unit, so that the bearing prevents relative longitudinal movement of the parts 13 and 15 while permitting rotation of one on the other; and the same applies to each end roll section 14, its spacer 16, and the bearing units 12 between them. At their ends, the spacers 15 have diametrically opposed longitudinal projections 17, each of which has lateral flanges or abutments 18 along its sides extending outwardly from the shaft. Each end spacer 16 has means for releasably locking it to the shaft 11, such as a screw 19 on a collar 20, and also has diametrically opposed projections or abutments 21 engageable with the adjacent abutments 18 on the next spacer 15. The projections 17 on each end of each spacer alternate around the shaft with the projections 17 (or 21) on the adjacent end of the next spacer and serve to space the roll sections 13—14 endwise from each other. In addition, while the spacers will tend to rotate in one and the same direction on the shaft as the sheath 10 is rotated by the passage of the material being treated, this is prevented by interengagement of the abutments 18—21 of adjacent spacers. That is, the first spacer 15 can rotate no farther once its abutments 18 have engaged the abutments 21 of the fixed spacer 16; and the second spacer 15 can rotate no farther once its abutments 18 have engaged the abutments 18 (now fixed) of the first spacer 15; and so on along the series of spacers.

In accordance with the present invention as illustrated, each end portion of the roll is provided with an elastic sleeve 22 closely surrounding the shaft 11, and an end cap 23 surrounding the sleeve 22 and likewise made of elastic material, such as neoprene. Each sleeve 22 is held stationary by a bracket 24, which clamps it around the shaft and supports the corresponding end of the shaft. The brackets 24 each include socket sections 25 and 26 which receive a hollow core 27 closely surrounding the sleeve 22. The core 27 is somewhat elastic although considerably harder than the sleeve 22, so that when the socket sections 25—26 are drawn together by clamping nuts 28, the core 27 is compressed tightly around the sleeve on the shaft. Within each core 27, the sleeve 22 terminates and abuts against a cup 22b of similar material, which covers the end of the shaft 11.

Each end cap 23 closely engages the sheath 10 around the adjacent end portion of the sheath and rotates with it. As shown, the cap has a peripheral flange 23a tightly engaged in an external annular recess in the sheath end portion. To secure the end cap, it is provided internally with a metal ring 29 molded therein and having internal threads 29a mating with external threads on the adjacent end portion of the roll section 14. Another metal ring 30 is also molded in the cap 23 where it more closely surrounds the sleeve 22. The ring 30 forms an annular sealing element closely surrounding and concentric with a pair of annular sealing elements 22a in the form of circumferential ribs on the sleeve 22. These ribs 22a, being integral with the sleeve, are elastic; and their diameters are such that they make a tight sealing engagement around the inside of the sealing ring 30.

In operation, the ring 30 rotates with the cap 23 and the sheath 10, and during this rotation the cap can flex in response to distortions of the sheath. Consequently, the ring 30 does not move radially of the shaft to any substantial extent, in spite of the expansions and contractions of the rotating sheath to which it is connected. Any slight radial movement of the ring 30 is accommodated by the elastic ribs 22a, which can flex with those movements while maintaining a continuous sealing contact around the ring 30. Thus, the interior of the roll is effectively sealed during its operation, so that escape of lubricant from within the sheath 10 and admission of dirt, etc., to the bearings are prevented.

To obtain access to the interior of the roll when it is not operating, the caps 23 may be readily removed by simply unscrewing them from the respective end sections 14. This permits adjustment of the set screws 19, as may be necessary when the direction of rotation of the roll is to be reversed or in case the end spacers 16 are to be pushed together to take up play between the spacers. If desired, each sleeve 22 can be positioned on the shaft so that its inner end bears against the adjacent spacer 16, as illustrated in Fig. 1. In this way, the adjacent end spacer 16 is held against outward movement along the shaft even when its set screw 19 is loosened, as may be the case when the other end spacer 16 alone is to be secured against rotation on the shaft.

It will be observed that the sleeve and cup 22—22b at each end portion of the shaft not only prevent the escape of lubricant and admission of dirt, etc., but also cover the otherwise exposed parts of the shaft. Thus, an expensive alloy steel shaft is not needed for application where corrosion is involved. While I have described each cap 23 as flexing in response to distortions of the sheath 10, this flexing is not necessary because the sheath will flex at its ends to take care of its own distortions. Accordingly, the caps 23 may be made from a rigid material, such as plastic or metal. When made of neoprene or similar material, however, not only can the caps 23 flex as described but they can be easily molded, are highly anti-corrosive, and are not easily marked by a blow from a blunt object or tool.

I claim:

1. In an expander and contractor roll for flexible sheet material, which includes a stiff longitudinally curved shaft, an elastic sheath surrounding the shaft in spaced relation thereto and forming the working face of the roll, and bearing means supported on the shaft within the sheath and mounting the sheath for rotation relative to the shaft, the improvement comprising, at each end portion of the shaft, a sleeve fitted closely around the shaft, a cap in sealing contact with the flexible sheath around the end thereof and rotatable with the sheath, intercontacting annular members on the cap and sleeve, respectively, forming a seal around the shaft, the sleeve having an extension projecting from said annular member on the sleeve toward the corresponding end of the shaft, and a bracket supporting said end of the shaft and clamping the sleeve extension around the shaft, whereby the bearing means are sealed at the end of the flexible sheath.

2. The improvement according to claim 1, in which the cap is flexible.

3. The improvement according to claim 1, in which the cap is flexible, said annular sealing member on the cap being a substantially rigid ring.

4. The improvement according to claim 1, in which both the cap and the sleeve are made of elastic material.

5. The improvement according to claim 1, in which both the cap and the sleeve are made of elastic material, one of said annular sealing members being a substantially rigid ring and the other being a rib making a sliding contact with the ring.

References Cited in the file of this patent
UNITED STATES PATENTS

| | | |
|---|---|---|
| 1,595,544 | Farrell | Aug. 10, 1926 |
| 2,562,949 | Robertson | Aug. 7, 1951 |
| 2,582,280 | Robertson | Jan. 15, 1952 |
| 2,689,392 | Robertson | Sept. 21, 1954 |